(12) United States Patent
Trigui et al.

(10) Patent No.: US 11,597,077 B2
(45) Date of Patent: Mar. 7, 2023

(54) CABLE SUSPENDED ROBOT FOR INDUSTRIAL PLANTS

(71) Applicant: Saudi Arabian Oil Company, Dhahran (SA)

(72) Inventors: Hassane Trigui, Thuwal (SA); Abdoulelah Al-Hannabi, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 345 days.

(21) Appl. No.: 16/935,810

(22) Filed: Jul. 22, 2020

(65) Prior Publication Data
US 2022/0024031 A1 Jan. 27, 2022

(51) Int. Cl.
*B25J 9/10* (2006.01)
*B25J 13/08* (2006.01)
(Continued)

(52) U.S. Cl.
CPC ............ *B25J 9/104* (2013.01); *B25J 9/0009* (2013.01); *B25J 9/0081* (2013.01); *B25J 9/126* (2013.01);
(Continued)

(58) Field of Classification Search
CPC ........ B25J 9/009; B25J 9/0078; B25J 9/0081; B25J 9/104; B25J 9/126; B25J 9/1615;
(Continued)

(56) References Cited

U.S. PATENT DOCUMENTS

| 4,710,819 A | 12/1987 | Brown |
| 6,566,834 B1 * | 5/2003 | Albus .................... B25J 9/1623 318/566 |

(Continued)

FOREIGN PATENT DOCUMENTS

WO 2018210632 A1 11/2018

OTHER PUBLICATIONS

Nguyen, Dinh Quan. On the study of large-dimension reconfigurable cable-driven parallel robots. Diss. Universite Montpellier 2, 2014. 161 pages.
(Continued)

*Primary Examiner* — Dale Moyer
(74) *Attorney, Agent, or Firm* — Leason Ellis LLP (57) ABSTRACT

Cable-driven robotic platform systems and methods of operation are disclosed. The system includes a robotic platform suspended by a system of overhead cables, motorized cable reels and pulleys. A master control computer coordinates operation of the motorized cable system as a function of sensor data captured by navigation sensors on-board the platform so as to move the robotic platform inside an industrial plant. The system is configured to maneuver around pipings and avoid obstacles in the plant in order to maximize the effective workspace that the robotic platform can reach to perform operations including inspection or repair. Additionally, a robotic "wire jacket" device can be attached to suspension cables and configured to crawl along a cable. The wire-jacket can be selectively positioned on a cable to provide an intermediate cable suspension point that improves platform mobility within congested spaces and avoids obstacles.

14 Claims, 8 Drawing Sheets

(51) Int. Cl.
  *B25J 9/16*   (2006.01)
  *B25J 9/00*   (2006.01)
  *B25J 9/12*   (2006.01)
  *B25J 19/00*  (2006.01)

(52) U.S. Cl.
  CPC ............. *B25J 9/161* (2013.01); *B25J 9/1664* (2013.01); *B25J 13/088* (2013.01); *B25J 19/0004* (2013.01)

(58) Field of Classification Search
  CPC ...... B25J 9/1664; B25J 9/1666; B25J 13/088; B25J 19/004; G05B 2219/40273
  See application file for complete search history.

(56) References Cited

U.S. PATENT DOCUMENTS

| | | |
|---|---|---|
| 6,873,355 B1 | 3/2005 | Thompson et al. |
| 7,239,106 B2 | 7/2007 | Rodnunsky et al. |
| 8,199,197 B2 | 6/2012 | Bennett et al. |
| 10,369,693 B1* | 8/2019 | Levine ................ B25J 9/104 |
| 2006/0033463 A1* | 2/2006 | Rodnunsky ............ B25J 9/0078 318/649 |
| 2017/0369166 A1 | 12/2017 | van den Heuvel |
| 2018/0231100 A1* | 8/2018 | Khajepour .......... G05B 19/402 |
| 2019/0098221 A1 | 3/2019 | Troy et al. |
| 2020/0298395 A1* | 9/2020 | Monti .................... B25J 9/0078 |
| 2021/0003386 A1* | 1/2021 | Caro .................... G01B 11/005 |
| 2021/0155459 A1* | 5/2021 | Garber ................. F16M 11/425 |

OTHER PUBLICATIONS

Rasheed, Tahir, et al. "Tension distribution algorithm for planar mobile cable-driven parallel robots." Cable-Driven Parallel Robots. Springer, Cham, 2018. 268-279.

Gagliardini, Lorenzo, Marc Gouttefarde, and Stéphane Caro. "Design of Reconfigurable Cable-Driven Parallel Robots." Mechatronics for Cultural Heritage and Civil Engineering. Springer, Cham, 2018. 85-113.

* cited by examiner

CABLE SUSPENDED ROBOT FOR INDUSTRIAL PLANTS

FIELD OF THE DISCLOSURE

The present invention relates to robotic devices and, in particular, a robotic platform supported by an overhead cable and pulley suspension system for positioning the robotic platform freely inside an industrial plant to monitor, inspect, and maintain industrial structures.

BACKGROUND OF THE DISCLOSURE

Routine inspection of equipment is critical in most industries in order to ensure safety and optimize performance.

Industrial plants, such as oil and gas and petrochemicals plants, usually consist of various multiple processes that are interconnected via pipes. Most of such plants are complex and involve a massive convoluted network of pipes. Inspecting and maintaining such facilities is a complicated and rather time-consuming task especially without the aid of technology. There are multiple technologies that can enhance asset integrity and maintenance by reducing time, cost and hazards associated with these jobs. For instance, robots have been implemented to perform inspection and maintenance jobs such as ground robots, magnetic robot, robotic arms, drones, etc. However, these technologies cover specific applications and have limitations as to where they can effectively be deployed or applied.

It is with respect to these and other considerations that the disclosure made herein is presented.

SUMMARY OF THE DISCLOSURE

According to a first aspect of the disclosure, a cable-driven robotic platform system is disclosed. The system comprises a robotic platform that includes a rigid chassis, a navigation sensor mounted to the chassis and an on-board controller in operative communication with the navigation sensor.

The system further comprises a cable suspension system. The cable suspension system includes a plurality of cables, wherein each cable extends from a respective motorized cable reel through a respective elevated suspension point and is attached at a free end to the robotic platform. The robotic platform is suspended from above by the cables and moveable within a three-dimensional workspace defined by a respective location of each respective elevated suspension point. Furthermore, a position of the platform within the workspace is a function of a respective length of the respective cable extending from the respective elevated suspension point to the platform.

The system further comprises a master control computer including a processor, a communication interface, a non-transitory computer-readable memory, and instructions in the form of code. The instructions, when executed by the processor, configure the processor to receive, via the communication interface, information captured by the navigation sensor including a present location of the platform within the workspace. The instructions further configure the processor to determine a location of an obstacle relative to the platform and send commands for controlling the motorized reels in a manner that causes the platform to move from the present location toward the target location along a navigation path suitable for avoiding the obstacle.

According to a further aspect, a method for navigating a cable-driven robotic platform system using one or more processors of a master control computer is disclosed. The method includes the step of providing, at the master control computer, a three-dimensional (3D) model of a workspace for a cable-driven robotic platform system. The workspace is defined by a plurality of elevated cable suspension points having respective locations about the workspace. The method also includes the step of identifying, using master control computer, based on data from one or more navigation sensors located on-board the platform, a present location of the robotic platform within the workspace. Additionally, the method includes receiving, at the master control computer, a target location within the workspace for the robotic platform to be navigated to. The method also includes the step of detecting, using master control computer, based data from the one or more navigation sensors, a location within the workspace of an obstacle that obstructs a path of one or more of a cable among the plurality of cables and the robotic platform. Furthermore, the method includes the step of defining a navigation path by the master control computer according to a displacement algorithm, the 3D model of the workspace, the present location, the target location and any detected obstacle locations. The method further includes the step of controlling, by the master control computer, one or more motorized cable reels to navigate the cable-driven robotic platform within the workspace according to a navigation path.

These and other aspects, features, and advantages can be appreciated from the accompanying description of certain embodiments of the invention and the accompanying drawing figures and claims.

DESCRIPTION OF CERTAIN EMBODIMENTS OF THE DISCLOSURE

By way of overview and introduction, a cable-driven robotic platform system is disclosed. The disclosed embodiments provide a solution configured to monitor, inspect, and maintain industrial facilities using an overhead cable driven robotic platform. The robotic platform is equipped with a self-contained system that is equipped with all the tools and sensors that enable the platform to perform various types of inspections as well as execute maintenance tasks.

Industrial plants, such as oil and gas and petrochemicals plants, usually consist of various multiple processes that are interconnected via pipes. Most of such plants are complex and involve a massive convoluted network of pipes. Inspecting and maintaining such facilities is a complicated and rather time-consuming task especially without the aid of technology. There are multiple technologies that can enhance asset integrity and maintenance by reducing time, cost and hazards associated with these jobs. For instance, robots have been implemented to perform inspection and maintenance jobs such as ground robots, magnetic robot, robotic arms, drones, etc. However, these technologies cover specific applications and have limitations as to where they can effectively be deployed or applied.

According to a salient aspect, the cable-driven robotic platform system is configured to reach to the majority of assets in a plant (elevated or on ground level) in order to perform various tasks in close proximity to the asset. The system, generally, includes a robotic platform that is attached to a system of overhead cables, motorized cable reels and pulleys which are used to move the robotic platform freely inside a plant, refinery, offshore platform, and other such industrial facilities (collectively "plants"). The cable suspension system infrastructure, namely, support columns and pulleys, is erected around the perimeter of the industrial plant such that the area of interest is reachable by the robotic platform. Embodiments of the cable-driven robotic platform system also are configured to maneuver around pipings and avoid obstacles in the plant in order to maximize the effective volume of the "workspace" that the robotic platform can reach to.

Figure 1:
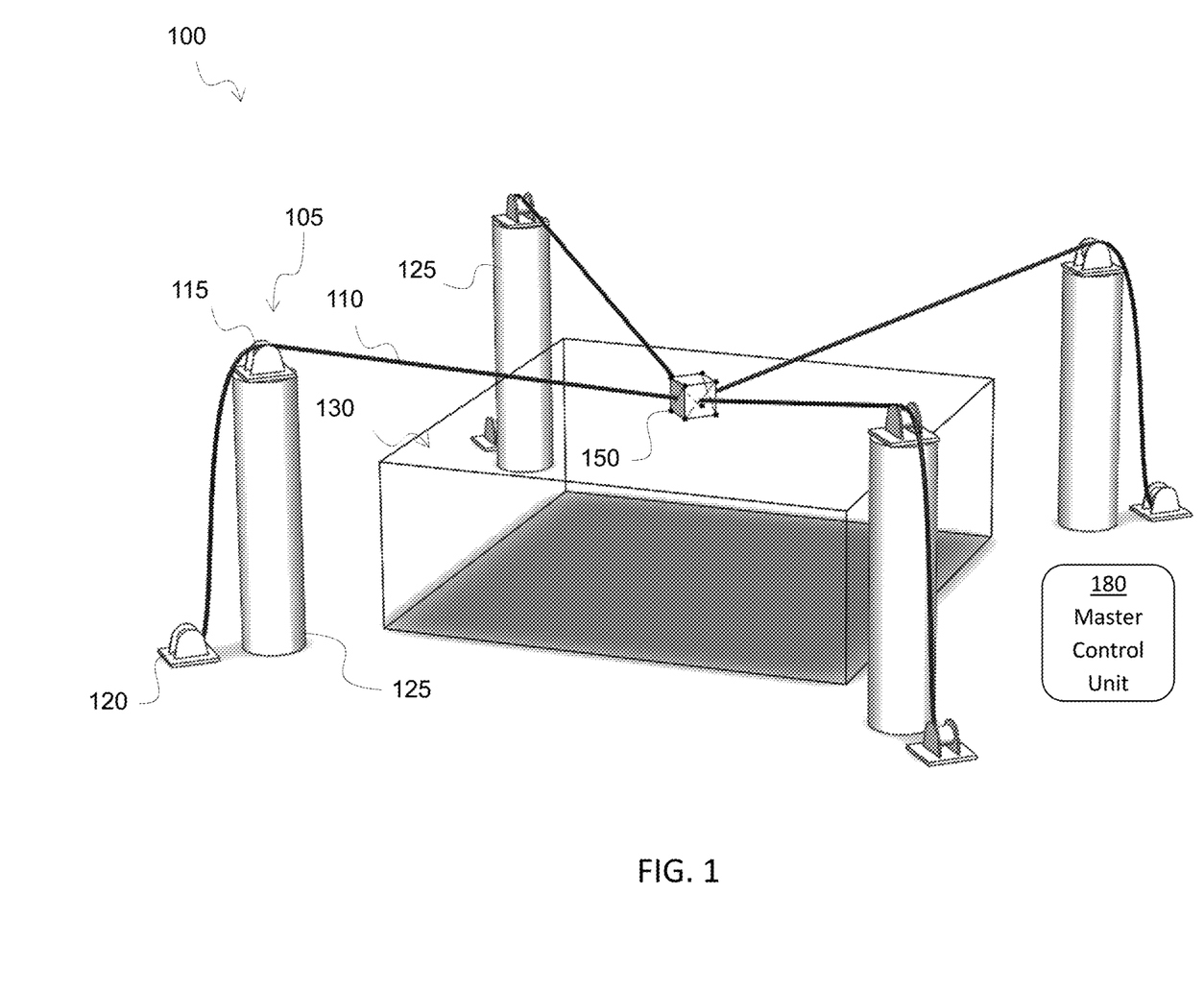
FIG. 1 is a perspective view of a cable-driven robotic platform system in accordance with one or more disclosed embodiments.

FIG. 1 illustrates an exemplary cable-driven robotic platform system 100 in accordance with one or more embodiments of the disclosure. The system comprises a robotic platform 150 suspended by a set of independent overhead cables 110 which are coupled to the platform and extend to respective motorized reels 120 distributed around the plant (not shown). The overhead cables run through respective pulleys 115 which can be elevated on support columns 125 positioned around the plant. The overhead pulleys act as suspension points from where the cable driven robotic platform is suspended. Each motorized reel is configured to reel-in or feed-out a respective cable and is computer controlled by the master control unit 180.

By using the force of gravity and pulling forces of the suspended cables, the robotic platform can be mobilized freely in 3-dimensions inside a working area 130. When not operational, the robotic platform can be moved by the suspension system to a docking station (not shown) where it can be recharged, maintained and safely protected from environmental effects.

Robotic Platform

Figure 2:
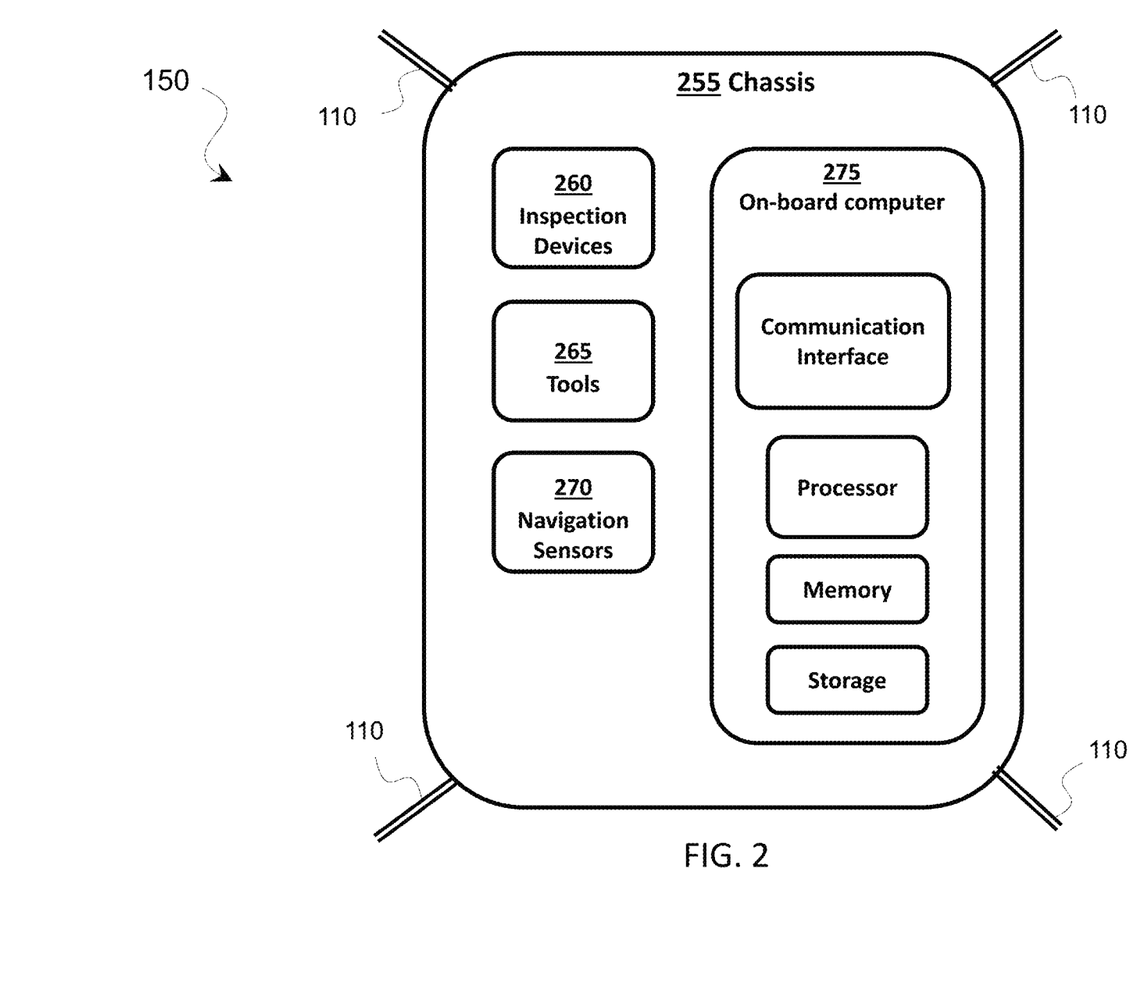
FIG. 2 is a conceptual diagram of a robotic platform system for use in the system of FIG. 1 in accordance with one or more disclosed embodiments.

FIG. 2 is a simplified conceptual diagram of the robotic platform 150 in accordance with one or more of the disclosed embodiments. The robotic platform 150 can comprise a chassis 255. The chassis is configured to be coupled to and suspended from the cables 110 (not shown) and is configured to support various robotic, sensor and computing components that facilitate operation of the robotic platform itself as well as the cable-driven robotic platform system 100.

The robotic platform can be configured incorporate any number of different industrial robotic devices that are known in the art. The robotic platform can be configured to carry different sets of tools and sensors that enable the platform to perform various tasks and inspection tests. The robotic platform can be connected to an external power source, for instance, power can be provided through one of the suspended cables 110. In addition, or alternatively, the robotic platform can be battery powered, in which case an on-board battery (not shown) can be charged when the robotic platform is docked.

The robotic platform 150 can be equipped with monitoring and inspection devices 260 configured to examine plant structures in close proximity. For instance, the robotic platform can include one or more multi-DOF robotic arms configured to extend probes and sensor heads and approach structures from different angles. For example, and without limitation, following are some exemplary known inspection device technologies that can be mounted on the robotic platform:

Camera for visual inspection to detect cracks, external corrosion and leaks.

Thermal camera to detect any abnormalities.

Wall thickness measurements using ultrasonic, phased arrays, magnetic based sensors, eddy current or Electromagnetic-Acoustic Transducer Testing (EMAT) sensors.

Coating integrity inspection such as holiday testing and film thickness measurement devices.

Cathodic protection sensor readings.

Gas sensors can be added on-board the platform to detect for hazardous gases in the field.

Moreover, the robotic platform 150 can be equipped any number of different tools 265. For instance, the robotic platform can include one or more multi-DOF robotic arms with an end effector configured to carry and operate sensors or tools for performing repairs such as removing scales and deposits, scraping old paints, coating, spraying, welding, etc. Having the robotic arm on the platform adds another degree of flexibility to the system reaching to complex structures or inspecting the 6 o'clock position of a structure. By way of further example, in some embodiments, the robotic platform can be configured to be used in firefighting by carrying water or any other substances that can be dropped at the center of a fire. Also, the robotic platform can be configured to transfer objects (e.g., packages) from one place in the working area 135 to another.

The robotic platform can also be equipped with navigation sensors 270. The navigation sensors are configured to collect information that is usable by the navigation control computing systems to guide the movement of the robotic platform and to ensure the path of the platform is clear from any obstacles or structures within the work space 135. In this regard, cameras and image processing, Light Detection and Ranging (LIDAR) and proximity sensors can be used as navigation sensors 270 (and/or inspection devices 260) to navigate in the working area 135. Navigation sensors such as GPS, accelerometers, and gyroscopes can also be provided on board the robotic platform.

All on-board subsystems of the robotic platform 150 can be interfaced to and controlled by a computer 275 mounted on-board the platform. The on-board computer manages communication between the robotic platform and the Master Control Unit 180 (MCU) as well as communicates with each tool 265 and sensors 260 and other on-board devices. The on-board computer, as would be understood, can include a processor and communication interface, among other components that are commonly found on robotic systems (e.g., computing components described in connection with FIG. 6).

One of the ultimate applications of the cable suspended robotic system is performing autonomous or remotely controlled monitoring and inspection to unmanned offshore rigs or platforms. Close visual monitoring of the operation of unmanned rig is important to ensure the safety of the platform and protection to the environment. Close visual inspection can help discovery of external damages, cracks, leaks in the rig equipment. On Stream Ultrasonic Inspection is also crucial to determine the integrity of structures, equipment, pipes and other especially in extreme corrosive environment such as offshore. The erected cable suspended robot system enables the robot platform to navigate around the unmanned rig to monitor its safety closely and perform various inspection methods mentioned in the IDF. Moreover, the robotic platform can perform maintenance and repair defects in the rig or even be used for firefighting or as a crane to move stuff around.

In order for the cable suspended robot to be able to perform inspection, repair, firefighting and package transportation for unmanned rigs, the cable driven robotic platform system can be a modular system with interchangeable tool and sensor modules. Accordingly the system can further comprise a docking mechanism configured to interchange the platform module with the module that carries the right set of tools required for each of the applications. This includes mechanisms for pick-up, release, latch, docking with the different modules of the robotic platform.

Master Control Unit

Returning now to FIG. 1, the MCU 180 is the central computing device of the system 100 and coordinates operation of the various components. It is configured to communicate with and control the motorized reels' motors and the robotic platform subsystems. An exemplary configuration of the computer hardware and software components of the MCU is shown and described in connection with FIG. 6.

Figure 6:
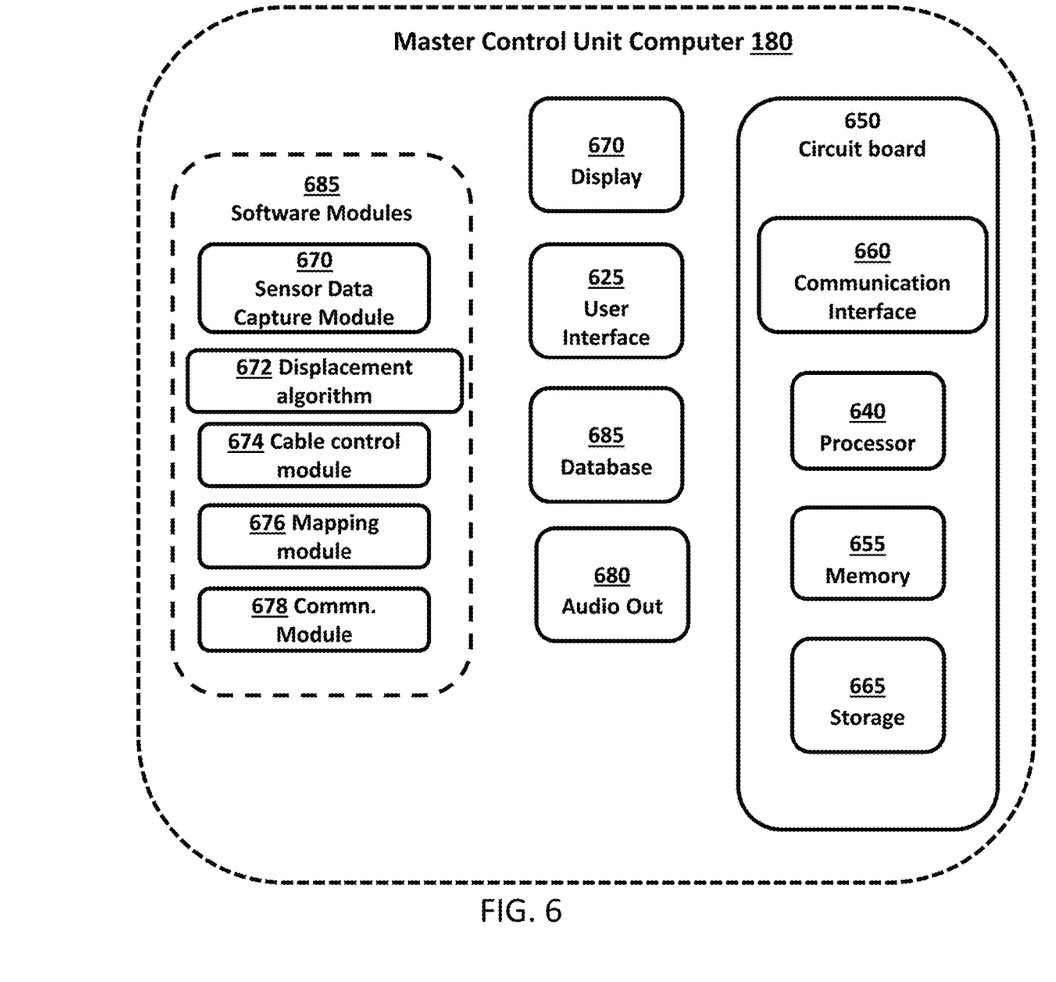
FIG. 6 is a conceptual diagram of an exemplary control computing device platform system for use in a cable-driven robotic platform system in accordance with one or more disclosed embodiments.

As further described in relation to FIG. 6, the MCU computer comprises a processor (not shown), which executes one or more software modules in the form of machine implementable code and, in doing so, is configured to control the movement of the robotic platform within the workspace 130. More specifically, the software configures the control computer to analyze the information, as measured by the navigation sensors 270 on board the robotic platform 150, and geometrically calculate various dimensions of the workspace. Additionally, the software configures the MCU processor to monitor and control operational parameters of the motorized reels 120, individually, to controllably move the platform within the working area as a function of the navigation sensor data. Although not expressly shown in FIG. 1, it should be understood that the components of the cable-suspension system, including the motorized reel 120 motors, reels and pulleys 115 can be fitted with sensors suitable for detecting various operational parameters usable to controllably move the platform within the workspace 135. For instance, sensors provided within the reels 115 such as rotational encoders operatively coupled to the reel can detect incremental angular movements of the reel. Such sensor information can be used to determine parameters relating to how much cable has been fed out, feed rate, the length of the cable between the reel and the platform, and the like.

In some implementations, the software can also configure the processor of the MCU to evaluate inspection device measurements and operate the robotic components of the platform.

Following is a list of some of the exemplary functions performed by the MCU:

Receives commands through the user interface such as an instruction to move the robotic platform to a given x, y, z coordinate location within the plant.

Controls the position and speed of the robotic platform by controlling the motors of the reels. A specific positional analysis and control algorithm can be implemented to control all the motors of the reels as the suspended cables are connected to the platform and their lengths are correlated.

Define a site map to define the working area boundaries and define obstacles boundaries using navigation sensor 270 information and/or inspection device sensor 260 information and other site-specific parameters.

Set a path for the robotic platform to avoid hitting obstacles.

Use feedback sensors from robotic platform to avoid obstacles (cameras, Laser, proximity sensors, and other such navigation sensors 270).

Perform inspection jobs, relay and store data (visual, UT, CP, etc.).

Controls the robotic arm(s) and tools to perform a specific task.

Monitors and keep track of the system states such as communication, power, etc.

Controls over all motions in the systems and stores data for further analysis.

Figure 3:
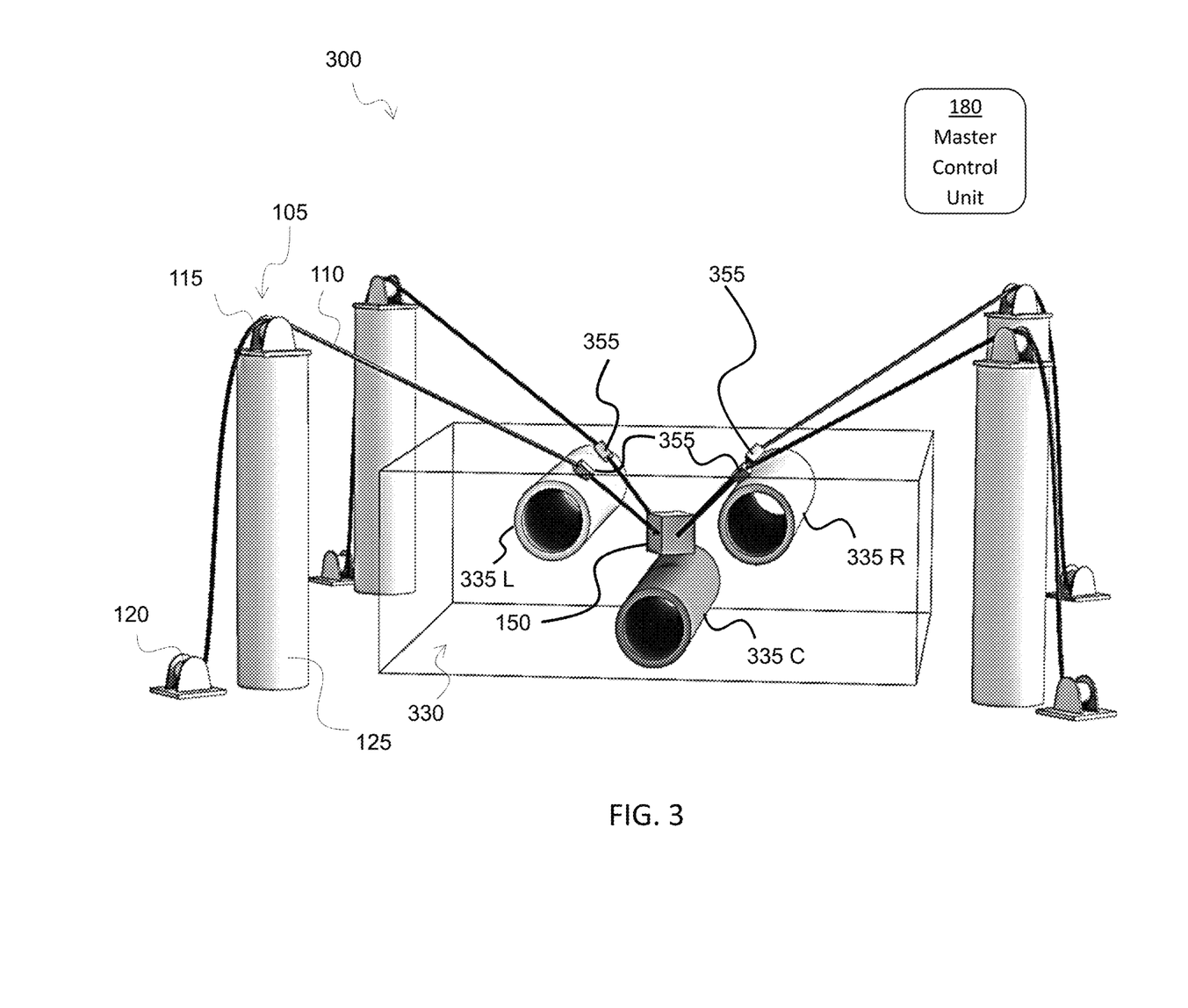
FIG. 3 is a perspective view of a cable-driven robotic platform system in accordance with one or more disclosed embodiments.

FIG. 3 illustrates an exemplary cable-driven robotic platform system 300 in accordance with an embodiment of the invention. The system 300 comprises the same basic cable suspension system as the exemplary system 100 shown in FIG. 1 and, as such, the components have like numbering in FIGS. 1 and 3. The system 300, however, further comprises "moveable wire jackets 355 that are provided on one or more of the suspended cables and that can enhance the ability of the robotic platform to be effectively mobilized within congested volumes of the workspace.

As shown, the system 300 is comprised of a robotic platform 150 suspended by a set of independent overhead cables 110 which are coupled to the platform and run all the way to respective motorized reels 120 distributed around the plant (not shown). The overhead cables run through respective pulleys 115 which can be elevated on support columns 125 positioned around the plant. The overhead pulleys act as suspension points from where the cable driven robotic platform is suspended. Each motorized reel is configured to pull-in or feed-out a cable and is computer controlled to mobilize the robotic platform freely in 3-dimensions inside a working area 330.

In practice, the working area 330 could be a congested volume with many obstacles that might otherwise impede a robotic platform's access to structures requiring inspection or work. For example, the workspace 330 shown in FIG. 3 include structures such as the three pipes 335 L, R and C (left, right and center).

In accordance with one or more embodiments, the system 300 can include moveable cable-crawling robots 355 ("wire jackets") that are provided on one or more of the suspended cables. As shown in FIG. 3, a moveable wire jacket 355 is provided on each of the suspended cables. Wire jackets are small controllable robots that are attached firmly to respective cables and are configured to crawl in either directions along the cable between the suspension point and the platform.

According to a salient aspect, the moveable wire jackets can be controllably moved along the cables in order to change the effective locations of the suspension points and, in doing so, can create a different effective working area within which the robotic platform can be moved. Put another way, the wire jackets act as intermediate suspension points for the robotic platform in order to avoid hitting and damaging other structures that are in the way. One wire jacket or more can be used on each cable if more obstacles are to be avoided.

Figure 4A:
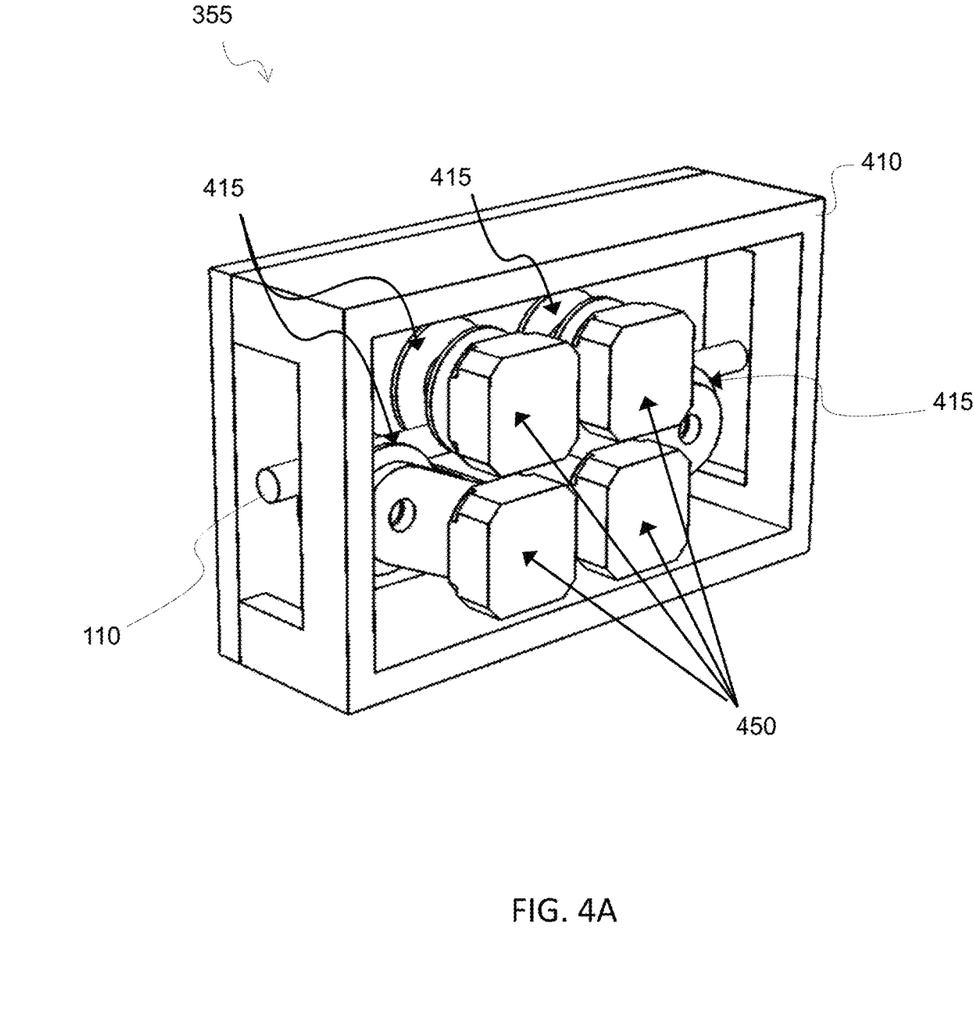
FIG. 4A is a schematic of a cable mounted robot for use in the system of FIG. 3 in accordance with one or more disclosed embodiments.
Figure 4B:
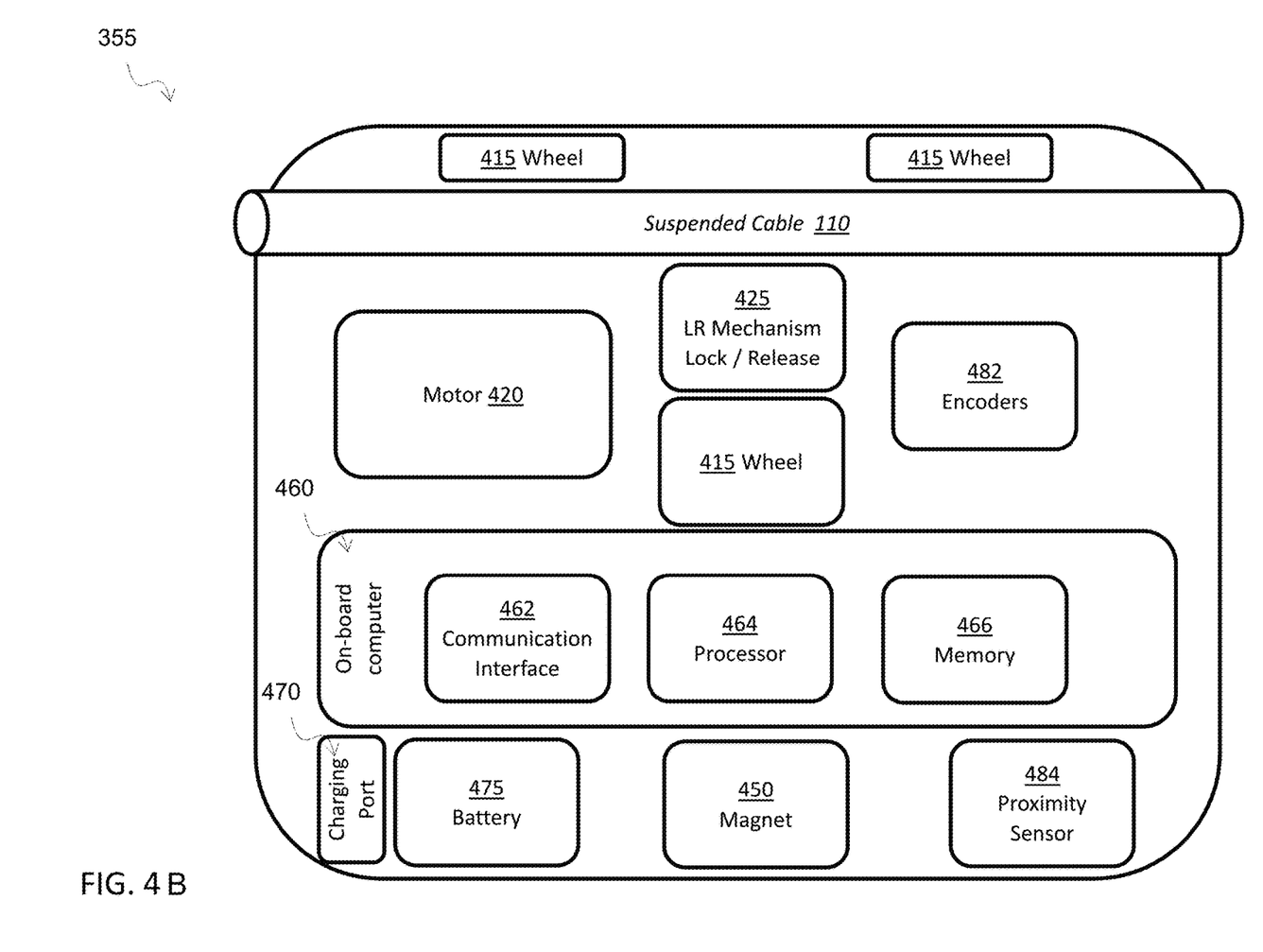
FIG. 4B is a conceptual diagram of the primary components of the cable mounted robot of FIG. 4A in accordance with one or more disclosed embodiments.

FIG. 4A is a perspective side view of an example configuration of a wire jacket. FIG. 4B is a conceptual diagram of the primary components of the wire jacket of FIG. 4A. As shown, the wire jacket comprises an outer housing 410 that the cable 110 passes through. The wire jacket further comprises of a set of wheels or pulleys 405 that tightly attach to the cable near the midpoint of the wire jacket. The wire jacket further comprises of a set of wheels or pulleys 415 that can be tightly attached to the cable towards the front and back ends of the wire jacket housing 410. The wheels can be selectively tightened against the cable or released depending on the desired amount of friction between the wheels and the cable. One or more motors 420 drive one or more of the wheels enabling the wire jacket to be controllably driven along the cable.

The wire jackets can also include a braking device, referred to as a lock/release or LR mechanism 425, configured to allow the wire jacket to hold in a fixed position along the cable or otherwise resist cable movement relative to the wire-jacket.

The wire jackets can also include an anchoring mechanism 450 configured to selectively couple the wire jacket to an object within the workspace in response to control commands received from the master control computer. As shown in FIG. 4B, the anchoring mechanism can comprise a magnet. The magnets in the wire jacket could be actuated switchable magnets, electro magnets, or tiny permanent magnets which can be used to attach the wire jacket to the obstacle if the obstacle is ferromagnetic. If the obstacle material is non-ferromagnetic, the external surface of the wire jacket could be made of roughened micro-structure to increase the friction.

Each wire jacket also includes an on-board controller 460 having a wireless communication interface 462 for receiving commands from one or more of the MCU and the platform controller and the like. The controller comprises a processor 464 and a memory 466. The controller is also is in operative communication with the one or motors, e.g., motor 420, for driving one or more of the wheels, as well as the braking device 425 and attachment mechanism 450 so as to control operation of said devices in response to the received control commands.

The controller of the wire jacket can also be in operative communication with one or more proximity sensors 484 and encoders 482. The proximity sensors 484, as further discussed herein can be used to detect objects in proximity to the wire jacket to assist in navigation and operation of the wire jacket. The encoders can be used to determine the distance traveled by the wire jacket along the cable 110. Other on-board sensors can be provided to assist in navigation, for example, cameras, position and location sensors among other suitable navigation sensors.

In operation, when the robotic platform is intended to be moved to a position where one (or more) of the suspended cables will hit an obstacle, a wire jacket can be dispatched, by the MCU, along the cable to the position of the obstacle. Accordingly, wire jackets can be configured to anchor on the obstacle structure. Once anchored, the wire jacket will act as a pulley or a new suspension point for the robotic platform and define a new effective workspace within which the platform can be moved.

For instance, in the exemplary practical scenario shown in FIG. 3, in order for the robotic platform 150 to access the pipe 335C and avoid the cables hitting and scratching the pipe obstacles 335L and 335R the wire jackets 335 are moved into position and attached to pipes 335L and 335R thereby allowing the platform to be moved within the smaller effective workspace and avoid the obstacle.

It is important to note that the particular location of such new suspension points will have to be accounted for in the displacement algorithm of the robotic platform since the suspended cable is no longer a single straight line, rather, multiple lines.

In addition to sensors on-board the wire jackets and robotic platform, the overall cable suspended system can be monitored by cameras fixed on top of the support columns allowing to control system or an operator to oversee the cables and wire jackets movements and ensuring the plant safety. For instance, a virtual replica of the suspended robotic platform can be digitally created on top of a 3D map of the plant. This would enable remote operators to simulate and approve all scenarios the suspended cable system can perform. In addition, it is worth noting that it is possible that some obstacles will not be able to withhold the load the wire jacket is putting along with the system weight. Accordingly, in the pre-deterministic map of a plant which is used to navigate the robotic vehicle, obstacles capable of withstanding vertical or axial force are pre-determined can be identified such that the MCU instructs the wire jackets to anchor only to identified obstacles having suitable strength.

Figure 7:
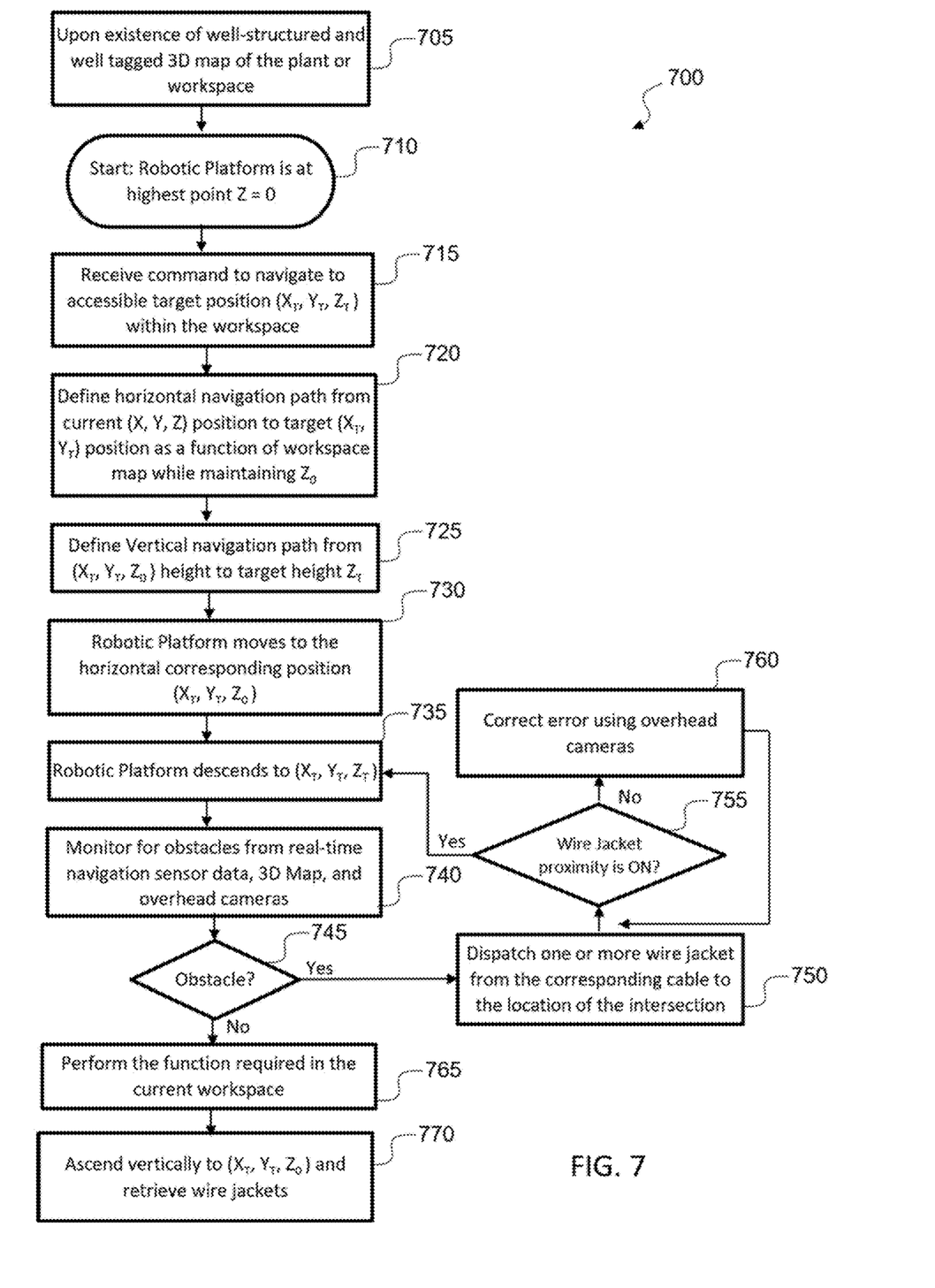
FIG. 7 is a flow diagram of an exemplary routine for controlling a cable-driven robotic platform system in accordance with one or more disclosed embodiments.

FIG. 7 is a process flow diagram illustrating an exemplary routine 700 for controllably moving a platform using the exemplary cable-driven robotic platform system 300 shown and described in FIGS. 3-4. Preferably, prior to movement of the platform within a workspace, the MCU is provided with a well-structured and well tagged 3D map of the plant or workspace at step 705. Preferably, the routine for moving the platform to a target location also begins with the platform being moved to a highest-position, Z=0, at step 710.

At step 715, the MCU 180 receives an input defining a target position within the workspace 330 for the platform 150 to be moved to, for instance, a command to navigate to accessible target position $(X_T, Y_T, Z_T)$ within the workspace, say, the position of the platform as it is shown in FIG. 3.

At step 720, the MCU defines horizontal navigation path from current (X, Y, Z) position to target $(X_T, Y_T)$ position as a function of workspace map while maintaining $Z_0$. The navigation path is defined by the MCU using a displacement algorithm and according to the three-dimensional map of the workspace. Inputs to the displacement algorithm further include the current position of the platform, as measured in real time by the navigation sensors 270, and the target position.

Similarly, at step 725, the MCU defines a Vertical navigation path from $(X_T, Y_T, Z_0)$ height to target height $Z_T$.

At step 730, the MCU controllably moves the robotic platform to the horizontal corresponding position $(X_T, Y_T, Z_0)$ according to the horizontal navigation path. The movement toward the target position according to the defined navigation paths can be performed in view of real-time navigation sensor data, which can be continuously monitored by the MCU. As noted, movement of the platform is performed by coordinated operation of one or more of the motorized reels 120.

Similarly, at step 735, the MCU controllably moves the robotic platform to the vertical corresponding position ($X_T$, $Y_T$, $Z_T$) according to the vertical navigation path.

At step 740, the MCU, in conjunction with the on-board computer 275, monitors sensor data captured using one or more of the navigation sensors 270. At step 745, the MCU based on the monitoring step, detects whether any obstacles are in the path of one or more of the platform or the cables during movement. In addition or alternatively, obstacles can be detected based on the workspace map, which can include previously recorded information about the location of one or more obstacles within the workspace. Accordingly, the location of obstacles can be evaluated prior to movement, e.g., while defining the navigation path at step 710, or during movement of the robotic platform. Moreover, in one or more embodiments, the real-time navigation sensor data can be used to dynamically refine the workspace map and, as necessary, refine the navigation path in near real time.

As shown in FIG. 7, in the event that an obstacle is not detected at step 745, the MCU continues to move the platform toward the target position until it is reached. If, however, the MCU determines at step 745 that the platform or a suspended cable will hit an obstacle, the MCU can dispatch one or more cable jackets at step 750 to assist in avoiding the obstacle and facilitating further movement of the platform toward the target position. For instance, as previously noted, in the exemplary practical scenario shown in FIG. 3, in order for the robotic platform 150 to access the pipe 335C and avoid the cables hitting and scratching the pipe obstacles 335L and 335R the wire jackets 335 are moved into position and attached to pipes 335L and 335R thereby allowing the platform to be moved within the smaller effective workspace and avoid the obstacle.

More specifically, for example, it is determined that a particular cable will intersect with the obstacle, a travel distance of the wire jacket along that cable is calculated according to the projected intersection point on the cable and current position of the wire-jacket on the cable. The MCU sends a command to the wire jacket to travel the calculated travel distance toward the obstacle. In response, the processor 464 instructs the LR mechanism to lock such that wheels 415 and the cable are engaged together and locked in position in order to create sufficient friction for moving the wire jacket along the cable. Next, the motor 420 attached to the driven wheels is activated by the processor causing the wire jacket to crawl down the cable until the travel distance value measured using the encoder 482 matches the calculated travel distance at which point the processor 464 commands the motor to stop and break.

At step 755, the master control unit lowers the suspended robotic platform until the intersection point between the identified cable and the obstacle is in close proximity. In particular, the position of the wire-jacket relative to the obstacle is monitored to ensure the wire jacket is sufficiently proximate to the desired intersection point with the obstacle. The monitoring can be performed by the MCU and or the wire jacket using, for example, navigational sensors on board the wire jacket including proximity sensor 484 or other location and position sensors (not shown). Proximity can also be monitored by the MCU automatically from analyzing imagery captured using one or more overhead cameras. A system operator can also monitor proximity using the imagery, in addition or alternatively, so as to manually control final positioning of the wire jacket from a remote location.

If for example the wire jacket braked at a position on the cable away from the intersection point and it is determined at step 755 that the wire jacket is not sufficiently proximate to the object, the wire jacket can be repositioned in order to correct the error at step 760. For instance, the wire jacket motor can be activated to reposition the wire jacket whilst repeating step 755 for monitoring proximity.

Upon determining at step 755 that the wire jacket is sufficiently proximate to the obstacle, say, when the wire jacket is placed on top of the obstacle, the wire jacket's proximity sensor can be triggered causing the wire jacket to attach to the obstacle. For instance, detecting that the wire jacket is within a suitable range of the object using the proximity sensor 484, can cause the wire jacket's processor 464 to actuate the magnets 450 if the obstacle is ferromagnetic. Once the wire jacket is attached to the obstacle the LR mechanism 425 releases the wheels 415 from the cable thereby allowing the cable to slide through the wire jacket and creating a new anchor point and a new workspace for the robotic platform to be moved within.

Locking the LR mechanism 425 and releasing the wheels 415 in turn can inform the MCU that it can continue to lower the suspended robotic platform safely. Accordingly, the method 700 returns to step 735 in which the MCU controllably moves the robotic platform toward the vertical corresponding position ($X_T$, $Y_T$, $Z_T$) according to the vertical navigation path until it is determined the robotic platform has reached the target position or has reached another obstacle to navigate.

It should be understood that, after deployment of the one or more wire jackets at step 755, the MCU can be configured to recalibrate the effective workspace based on the position of the one or more wire jackets 335 that are positioned at step 720 and can re-define the navigation path. Specifically, because each wire jacket will act as a pulley or a new suspension point for the robotic platform, this location can be accounted to re-define the effective workspace that the platform can subsequently be moved within. The position of any new suspension points and any other effect they have on the geometry of the cable suspension system is also accounted for by the MCU in the displacement algorithm. Accordingly, prior to continuing at step 735, the method can return to repeat step 720-730 in view of any updated system parameters resulting from wire-jacket deployment.

Once the robotic platform reaches the target position ($X_T$, $Y_T$, $Z_T$), the robotic platform performs function required in the current workspace and as instructed by the MCU. Upon completion of the task, at step 770, the robotic platform is retrieved. More specifically, when the job of the robotic platform is completed, instructions sent to the wire jacket can cause the LR mechanism 425 to lock the wheels 415 with the cable and switch the magnets 450 off. The MCU then causes the robotic platform to ascend to ($X_T$, $Y_T$, $Z_0$) thereby detaching the wire jacket from the obstacle. The deployed wire jacket can then be instructed to return back to a home position, say, back to a docking station to recharge and shade where the LR mechanism is released.

In one or more embodiments, the wire jackets can be configured to utilize gravity to move along a cable toward an obstacle and back to the home position. Specifically, gravity can be used to roll the wire jacket from its high position near a support column and the wire jacket can be configured to break using the LR mechanism when an obstacle location is reached. The robotic platform suspension system could similarly be used to return the wire jacket to its docking station once the job is completed by raising the platform high enough to cause the wire jacket to passively roll back toward the support column. Such a configuration can simplify the design of the wire jackets.

It should be understood that one or more of the cables can include a wire jacket, and preferably each of the cables includes a wire jacket. Moreover, the cables can include multiple wire jackets. As such, multiple wire jackets on a given cable can be dispatched to the same obstacle or different obstacles. Accordingly, it should be understood that wire jackets can be selectively positioned and repositioned along a cable as necessary to facilitate anchoring to respective objects.

Figure 5:
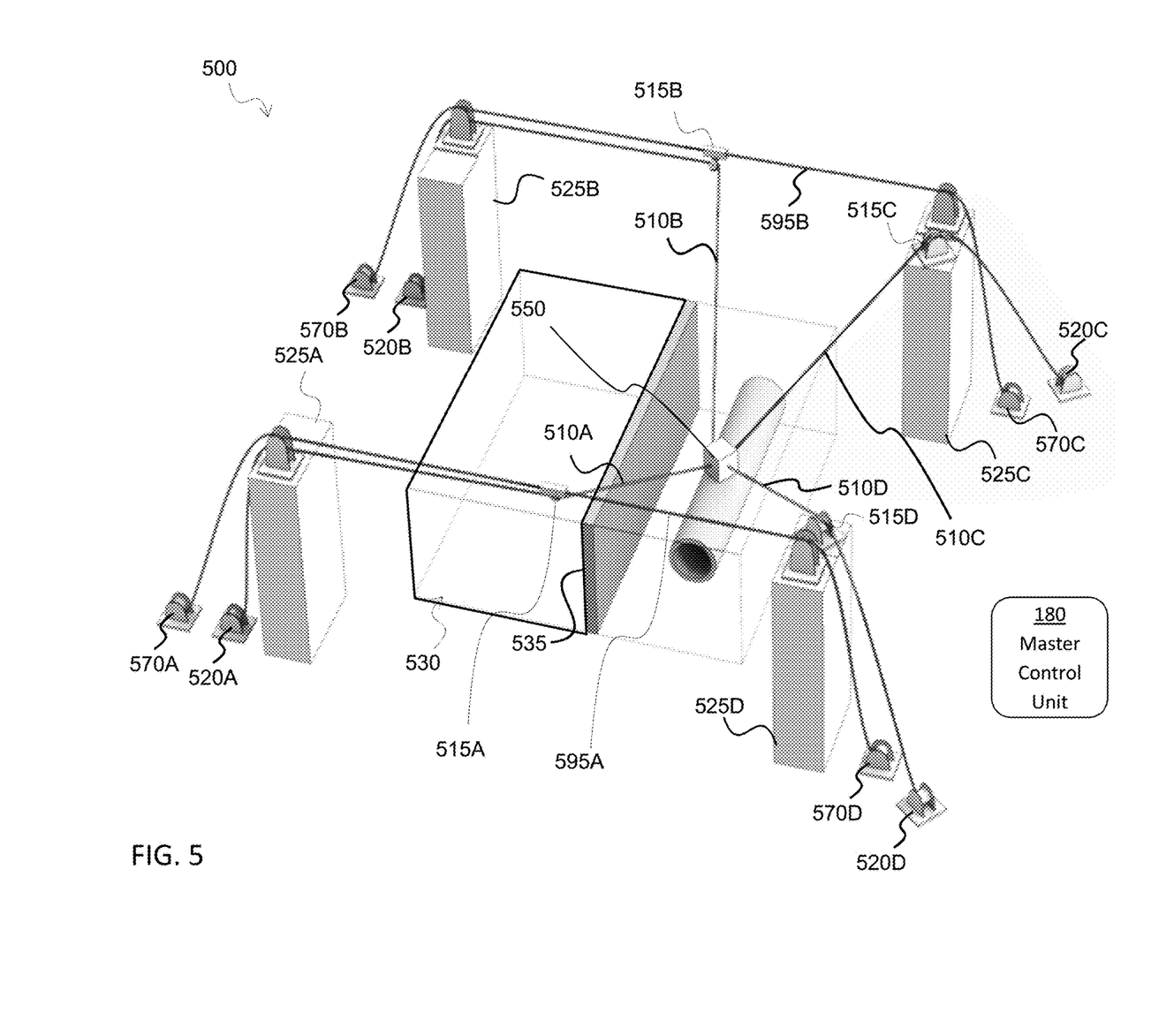
FIG. 5 is a perspective view of a cable-driven robotic platform system in accordance with one or more disclosed embodiments.

In a further embodiment, the cable suspension system can include moveable pulleys that can be used to reconfigure (e.g., relocate) the suspension points from which the robotic platform is suspended and, hence, change the working area accessible by the robotic platform. An exemplary configuration of a cable-driven robotic platform system having reconfigurable suspension pulleys is shown in FIG. 5.

As shown, the system 500 is comprised of a robotic platform 550 suspended using four overhead cables 510A-510C, which are coupled to the platform at a free end and run all the way to respective motorized reels 520A-520D distributed around the plant (not shown). Two of the overhead cables, namely cables 510C and 510D run through respective fixed pulleys 515C and D which are elevated on respective support columns 525C and 525D, respectively.

Two of the support cables, namely cables 510A and 510B run through reconfigurable pulleys 515A and 515B, respectively. This configuration includes an additional installation of cables and reels extending between two support columns to allow the flexible pulleys to move between those support columns rather than being fixed on a respective support column. In particular, pulley cable 595A is extending between columns 525A and 525D and connected to reconfigurable pulley 510A. Pulley cable 595A can be controllably driven by pulley reels 570A and 570D in order to adjust the position of the reconfigurable pulley 515A between columns 525A and 525D. The position of flexible pulley 510B is similarly moveable with respect to columns 525B and 525C using pulley reel 570B and 570D driving pulley cable 595B.

The overhead pulleys 515A-515D act as suspension points from where the cable driven robotic platform is suspended. Each motorized reel is configured to pull-in or feed-out a cable and is computer controlled to mobilize the robotic platform freely in 3-dimensions inside a working area 530. As shown in FIG. 5, in order for the robotic platform to access the structure and avoid the cables hitting and scratching the obstacle 535, two of the suspension points, namely reconfigurable pulleys 515A and 515B were moved in the x-axis to alter the effective working area and avoid the obstacle. Positioning the reconfigurable pulleys is controlled by the Master Control Unit 180 which can utilize algorithms that position the pulleys and navigate the robotic platform within a workspace as a function of the cable length and geometry resulting from the particular position of a reconfigurable pulley.

As can be appreciated, FIG. 5 illustrates a configuration in which the reconfigurable pulleys are moveable along a single axis (e.g., x axis). It should be understood that additional cables and reels can be added to expand the movement of a reconfigurable pulley to two dimensions (e.g., x and y axis) and three dimensions (e.g., x, y and z axis).

In addition or alternatively, other systems for controllably positioning a reconfigurable pulley can be utilized in the system 500. For instance, in accordance with one or more embodiment, reconfigurable pulley 515A can be mounted to a wire jacket 355 (not shown in FIG. 5). Instead of using additional pulley reels 570A and 570D, the wire jacket 355 can be configured to crawl along cable 595A, thereby selectively positioning reconfigurable pulley along cable 595A to define the effective workspace for the robotic platform 550. The robotic platform can comprise additional devices to assist in physically positioning or moving the robotic platform during operation.

FIG. 6 is a block diagram illustrating an exemplary configuration of the MCU 180 computer according to an embodiment of the present invention. As shown, the MCU can be arranged with various hardware and software components that serve to enable operation of the exemplary cable driven platform system configurations. It should be understood that other computing devices used in the various embodiments of the disclosure, including, the robotic platform's on-board computer 275 can have similar hardware and software components as shown and described in FIG. 6.

Components of the exemplary MCU 180 include a processor 640 that is shown in FIG. 6 as being disposed on a circuit board 650. The circuit board can include a memory 655, a communication interface 660 and a computer readable storage medium 665 that are accessible by the processor 640. The circuit board 650 can also include or be coupled to a power source (not shown) source for powering the computing device.

The processor 640 and/or the circuit board 650 can also be coupled to a display 670, for visually outputting information to an operator (user), a user interface 675 for receiving operator inputs, and an audio output 680 for providing audio feedback as would be understood by those in the art. As an example, the processor 640 could emit a visual signal from the display 670, for instance, a computer model depicting the dimensions of a storage container being calibrated. Although the various components are depicted either independent from, or part of the circuit board 650, it can be appreciated that the components can be arranged in various configurations.

The processor 640 serves to execute software instructions that can be loaded into the memory 655. The processor 640 can be implemented using multiple processors, a multi-processor core, or some other type of processor. The memory 655 is accessible by the processor 640, thereby enabling the processor 640 to receive and execute instructions stored on the memory 655 and/or on the computer readable storage medium 665. Memory 655 can be implemented using, for example, a random access memory (RAM) or any other suitable volatile or non-volatile computer readable storage medium. In addition, memory 655 can be fixed or removable.

The computer readable storage medium 665 can also take various forms, depending on the particular implementation. For example, the computer readable storage medium 665 can contain one or more components or devices such as a hard drive, a flash memory, a rewritable optical disk, a rewritable magnetic tape, or some combination of the above. The computer readable storage medium 665 also can be fixed or removable or remote such as cloud-based data storage systems (remote memory or storage configuration not shown). The computer readable storage medium 665, for example, can be used to maintain a database 685, which stores information relating to the capture of measurement data, the dimensional calibration of respective structures and/or data used or generated while carrying out operations and implementing aspects of the systems and methods disclosed herein.

One or more software modules 688 are encoded in the memory 655 and/or the computer readable storage medium 665. The software modules 688 can comprise one or more software programs or applications having computer program code or a set of instructions executed by the processor 640. Such computer program code or instructions for carrying out operations and implementing aspects of the systems and methods disclosed herein can be written in any combination of one or more programming languages. While the software modules 688 are stored locally in computer readable storage medium 665 or memory 655 and execute locally in the processor 640, the processor 640 can interact with a remotely-based computing platform (e.g., the robotic platform 150 computer 275) via communication interface 660, and via a local or wide area network to perform calculations, analysis, control, and/or any other operations described herein.

During execution of the software modules 685, the processor 640 is configured to perform the various operations described herein, including without limitation, the previously described routine 700 for controllably moving the platform 150. The software modules 688 can include code for implementing the aforementioned steps and other steps and actions described herein, for example and without limitation: a sensor data capture module 670, which configures the computing device 150 to capture and analyze sensor data measured using, inter alia, inspection devices 260, navigation sensors 270 and the like; a robotic platform displacement algorithm 672, which configures the processor 640 to define the navigation path and otherwise control the movement of the robotic platform 150 about the plant; a cable control module 674, which configures the processor 640 to control the operation of the cable reels, wire-jackets and other such components of the cable suspension system; a mapping module 676, which configures the processor 640 to calculate and model the geometry of the workspace and obstacles based on the captured sensor information and other system parameters such as suspension point locations, wire-jacket positions; and a communication module 678, which configures the processor 640 to communicate with remote devices (e.g., the robotic platform 150, the motorized reels, wire jackets and the like) over a communication connection such as a communication network or any wired or wireless electronic communication connection.

The program code of the software modules 685 and one or more of the non-transitory computer readable storage devices (such as the memory 655 and/or the computer readable storage medium 665) can form a computer program product that can be manufactured and/or distributed in accordance with the present disclosure.

It should be understood that various combination, alternatives and modifications of the disclosure could be devised by those skilled in the art. The disclosure is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A cable-driven robotic platform system, comprising:
a robotic platform including a rigid chassis, a navigation sensor mounted to the chassis and an on-board controller in operative communication with the navigation sensor;
a cable suspension system including:
a plurality of cables, wherein each cable extends from a respective motorized cable reel through a respective elevated suspension point and is attached at a free end to the robotic platform, whereby the robotic platform is suspended from above by the cables and moveable within a three-dimensional workspace defined by a respective location of each respective elevated suspension point, and
wherein a position of the platform within the workspace is a function of a respective length of the respective cable extending from the respective elevated suspension point to the platform;
a master control computer including a processor, a communication interface, a non-transitory computer-readable memory, and instructions in the form of code that, when executed by the processor, configure the processor to:
receive, via the communication interface, information captured by the navigation sensor including a present location of the platform within the workspace,
determine a location of an obstacle relative to the platform, and
send commands for controlling the motorized reels in a manner that causes the platform to move from the present location toward a target location along a navigation path suitable for avoiding the obstacle; and
a cable crawling robot provided on a cable among the cables, the cable crawling robot including:
one or more motorized wheels in operative communication with a cable crawling robot controller configured to controllably move the cable crawling robot along the length of cable between the respective elevated suspension point and the platform in response to control commands received from the master control computer.

2. The cable-driven robotic platform system of claim 1, the cable crawling robot further comprising:
- an attachment mechanism configured to selectively couple the cable crawling robot to an object within the workspace in response to a control command received from the master control computer, and
- the cable crawling robot controller having a wireless communication interface and being in operative communication with the one or more motorized wheels and the attachment mechanism.

3. The cable-driven robotic platform system of claim 2, wherein the attachment mechanism of the cable crawling robot comprises one or more of: an electro-magnet, an actuated switchable magnet, or a roughened exterior surface of the cable crawling robot.

4. The cable-driven robotic platform system of claim 1, wherein the cable crawling robot further comprises:
- a braking device arranged to resist movement of the cable crawling robot relative to the cable.

5. The cable-driven robotic platform system of claim 1, wherein the instructions further configure the master control computer processor to:
- in response to determining the location of an obstacle, send commands for moving the cable crawling robot to a particular position along the cable, wherein the particular position is determined by the control computer as a function of the location of the obstacle and the target location.

6. The cable-driven robotic platform system of claim 5, wherein the instructions further configure the processor to:
- send a control command causing the cable crawling robot to attach to an object within the workspace, thereby defining an intermediate suspension point for the cable, and
- wherein in response to the cable-crawling robot defining an intermediate suspension point, the processor is further configured to re-define the navigation path as a function of the intermediate suspension point.

7. The cable-driven robotic platform system of claim 1, wherein the instructions further configure the processor to define the navigation path for the platform as a function of the present location, the target location, the respective location of the respective elevated suspension point, the respective length of the respective cables and any intermediate suspension point defined by the cable crawling robot.

8. The cable-driven robotic platform system of claim 1, wherein the robotic platform further comprises:
- a robotic arm communicatively coupled to the on-board controller and being configured to perform one or more of inspection and maintenance of industrial assets within the workspace.

9. The cable-driven robotic platform system of claim 1, wherein the respective elevated suspension point comprises an elevated pulley.

10. A method for navigating a cable-driven robotic platform system executed by one or more processors of a master control computer, the method comprising:
- providing, at the master control computer, a three-dimensional (3D) model of a workspace for a cable-driven robotic platform system, the workspace being defined by a plurality of elevated cable suspension points having respective locations about the workspace;
- identifying, using master control computer, based on data from one or more navigation sensors located on-board the platform, a present location of the robotic platform within the workspace;
- receiving, at the master control computer, a target location within the workspace for the robotic platform to be navigated to;
- detecting, using master control computer, based data from the one or more navigation sensors, a location within the workspace of an obstacle that obstructs a path of one or more of a cable among the plurality of cables and the robotic platform;
- in response to detecting the obstacle at the location, dispatching, by the master control computer, a cable crawling robot to a particular position along a cable among the cables, wherein the cable crawling robot is provided on the cable and configured to move along the cable between a respective suspension point and the platform in response to control commands from the master control computer, and wherein the particular position is determined by the control computer as a function of the location of the obstacle and the target location;
- defining, by the master control computer according to a displacement algorithm, the 3D model of the workspace, the present location, the target location and any detected obstacle locations, a navigation path; and
- controlling, by the master control computer, one or more motorized cable reels to navigate the cable-driven robotic platform within the workspace according to a navigation path.

11. The method of claim 10, further comprising:
- analyzing, with the master control computer, the data from the navigation sensors in real time to monitor the current position of the platform and detect the location of any obstacles while navigating the platform within the workspace.

12. The method of claim 10, wherein the step of detecting the obstacles is performed using the 3D model.

13. The method of claim 10, further comprising:
- after the dispatching step,
  - causing, by the master control computer, the cable crawling robot to attach to an object in proximity to dispatched cable crawling robot, whereby attachment to the object defines an intermediate suspension point for the cable, and
  - controlling, by the master control computer, one or more motorized cable reels to navigate the cable-driven robotic platform within the workspace according to the navigation path.

14. The method of claim 13, further comprising: re-defining the navigation path as a function of a location corresponding to the intermediate suspension point, wherein the navigation path is re-defined as a function of the present location, the target location, the respective locations of the respective elevated suspension points, a respective length of the cables and the location corresponding to the intermediate suspension point.

* * * * *